2,998,400
FLOC-FREE POLYVINYL ACETATE EMULSIONS EMPLOYING POLYVINYLMETHYL ETHER COPOLYMER AS PROTECTIVE COLLOID AND PROCESS OF PREPARATION
David M. French, Wyandotte, Mich., assignor to Wyandotte Chemicals Corporation, Wyandotte, Mich., a corporation of Michigan
Filed May 15, 1958, Ser. No. 735,480
13 Claims. (Cl. 260—29.6)

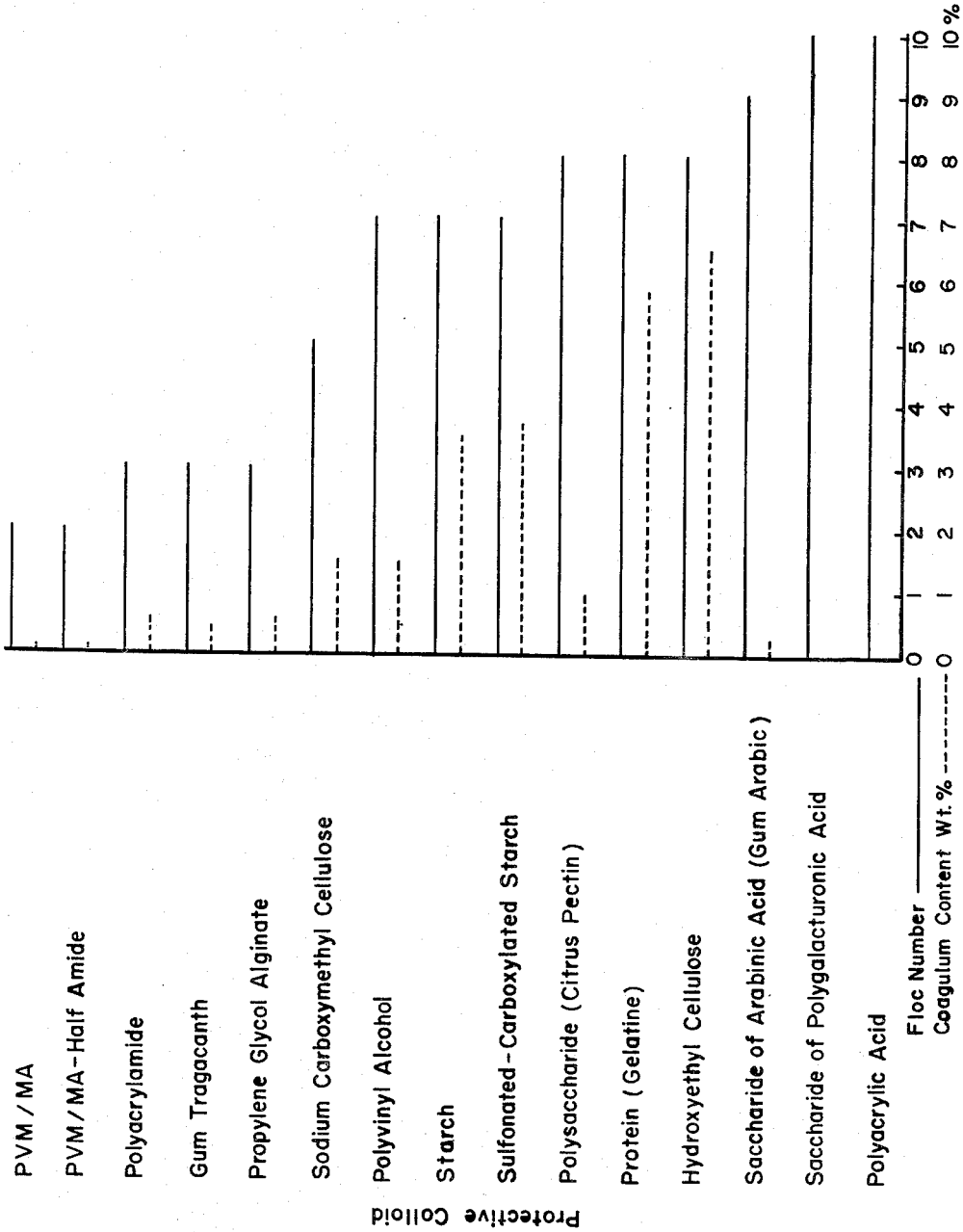

This invention relates to polyvinyl acetate and copolymer emulsions and methods for preparing the same. More particularly, it pertains to monomeric vinyl acetate emulsion polymerization recipes particularly adapted for forming floc-free polyvinyl acetate emulsions.

Polyvinyl acetate emulsions have found extensive application in the adhesive and coating arts as well as in the textile, paper and cement industries. As an adhesive, polyvinyl acetate emulsions form strong flexible bonds with a wide variety of materials which include, for example, nonabsorbent materials such as metals, porcelain, mica or stone and, particularly, porous materials such as paper, fiber, cloth, leather, cork or wood. The emulsions are also used in the lamination or bonding of materials such as paper, cellulose acetate film, cellophane, textiles and aluminum foil to paper. The emulsions are particularly advantageous because they require no organic solvents, and are colorless, mold-resistant, and free from undesirable odor. Polyvinyl acetate emulsions are also excellent vehicles for paint formulations. An emulsion paint can be prepared by adding a plasticized polyvinyl acetate emulsion under continuous agitation to an aqueous dispersion of pigments.

Polyvinyl acetate emulsions can be prepared, in general, by batch, delayed monomer addition or continuous processes. Variations of the delayed addition technique for preparing the emulsion include surfactant delayed addition and emulsion delayed addition.

In the batch process, monomeric vinyl acetate or a comonomer thereof is mixed with an aqueous solution of emulsifying agent, catalyst and protective colloid under continuous agitation. The resulting mixture, which comprises small droplets of monomer suspended in the aqueous medium, is heated under reflux until the polymerization is substantially completed. The reaction is exothermic but is easily controlled by employing suitable heat transfer equipment. In the emulsion delayed addition process, an agitated mixture of monomer or comonomer, water, emulsifying agent, protective colloid and about 50% of the catalyst is added to a stirred solution of water, emulsifying agent, protective colloid and the remaining 50% of the catalyst at a temperature sufficient to maintain a slow reflux of the monomer. After the polymerization is completed, the residual monomer, if any, can be removed by blowing with air or by distillation. In the continuous process, monomer, catalyst and the stabilizer solution are run separately into a first reactor held at a temperature of about 70° C. and the overflow runs into a second reactor maintained at suitable polymerization temperatures. Additional catalyst is metered into the second reactor where the polymerization reaction is completed.

In the preparation of polyvinyl acetate emulsions, in accordance with the various processes described above, particles of polymer are formed in the water phase and if the emulsion is of good quality, these particles remain suspended in the water during and after polymerization. If the polymer formed in the reaction is to be recovered and sold as a solid material, the quality of the emulsion is of little account except as it affects the course of polymerization. However, if the emulsion produced during polymerization is to be marketed as such, the emulsion must be very stable and contain few, if any, large particles or masses of coagulum.

The emulsion after polymerization will be found to consist mainly of small particles in suspension which have a certain average size, usually not over 1/1000 of a millimeter in diameter. In addition, there will be aggregates of particles varying up to a millimeter in diameter which cannot be filtered off and which are hereinafter designated as "floc." There are also large masses of polymer which can be removed by filtering the emulsion through cloth and which ordinarily represent waste. These large masses of polymer are hereinafter designated as "coagulum."

Since the presence of floc and coagulum is undesirable in polyvinyl acetate latices, an object of this invention is, therefore, to provide a vinyl acetate emulsion polymerization recipe which is particularly adapted for forming floc-free polyvinyl acetate emulsions and which is at the same time mechanically stable.

Another object of this invention is to provide a protective colloid which, when added to a vinyl acetate emulsion polymerization recipe, will eliminate and/or significantly minimize the amount of floc and coagulum occurring in the emulsion polymer.

A further object of this invention is to provide a process for preparing floc-free polyvinyl acetate emulsions.

A still further object of this invention is to provide a process for preparing floc-free polyvinyl acetate-copolymer emulsions.

These and other objects which will be readily apparent from the following description of the invention are accomplished by employing as the protective colloid in a vinyl acetate emulsion polymerization recipe a member selected from the group consisting of vinyl methyl ether-maleic anhydride copolymer, vinyl methyl ether-maleic anhydride/half amide copolymer and mixtures thereof.

Vinyl methyl ether-maleic anhydride copolymer hereinafter sometimes referred to as "PVM/MA" consists of alternating methyl vinyl ether and maleic anhydride units as illustrated graphically below:

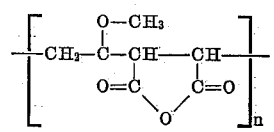

Vinyl methyl ether/maleic anhydride-half amide copolymer sometimes hereinafter referred to as "PVM/MA-half amide" is prepared by reacting ammonia with PVM/MA and is illustrated graphically below:

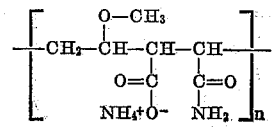

These copolymers are described in a pamphlet entitled "PVM/MA" New Product Bulletin No. P-103 issued January 3, 1953 by the Commercial Development Department, General Aniline Works Division of the General Aniline and Film Corporation. PVM/MA-half amide is more fully described in "Preliminary Data Sheet No. P-118" issued on September 21, 1953 by the General Aniline Works of the General Aniline and Film Corporation.

Although it is known to formulate previously polymerized polyvinyl acetate emulsions with PVM/MA as illustrated in the brochure entitled "Adhesives and Coatings from Vinyl Ether Polymers and Copolymers" Bulletin P-123 issued on October 1, 1956 by the Commercial Development Department of the General Aniline and Film Corporation and, indeed, as is disclosed and claimed in U.S. 2,677,672—S. B. Luce, to the best of my knowledge this is the first time that it has been disclosed that PVM/MA can be effectively employed as a protective colloid in a vinyl acetate emulsion polymerization recipe before polymerization in order to prepare floc-free polyvinyl acetate emulsion polymers.

In accordance with certain of its aspects, this invention comprises new vinyl acetate emulsion polymerization recipes particularly adapted for forming floc-free polyvinyl acetate emulsions. The compositions of the invention are illustrated by the vinyl acetate emulsion polymerization recipe set forth below:

| | Parts by weight |
|---|---|
| Vinyl acetate | 70–100 |
| Comonomer | 30–0 |
| Water | 60–300 |
| Emulsifying agent | 2–7 |
| PVM/MA and/or PVM/MA-half amide | 0.25–3 |
| Catalyst | 0.05–0.5 |
| Alkaline buffer | 0.1–2.0 |

Emulsion copolymers of polyvinyl acetate are prepared by replacing up to 30 parts by weight of vinyl acetate with a comonomer. Typical examples of monomers which can be copolymerized with vinyl acetate in order to prepare floc-free emulsions include ethyl arcylate, alkyl acrylates, alkyl maleates, vinyl benzoate, vinyl crotonate, vinyl stearate and dibutyl fumarate.

The amount of water which is used in order to prepare the emulsions can be varied over a wide range. Thus, 60 to 300 parts of water can be employed for each 100 parts of monomer or comonomer. Although a large excess of water can be used, it is undesirable to do so because the yield of polymer per unit volume of reaction vessel becomes unduly small. An amount of water less than 60 parts by weight is undesirable because the viscosity of the polymerizing mixture becomes too high to permit adequate agitation. A preferred range is 75 to 125 parts of water per 100 parts of monomer.

Wetting agents are employed to expedite emulsification of the unsaturated material. Typical wetting agents include the well-known anionic and nonionic synthetic surfactants. Examples of anionic surfactants include alkyl aryl sodium sulfonates containing 8 to 18 carbon atoms in the alkyl radical such as dodecyl benzene sodium sulfonate and decyl benzene sodium sulfonate; sodium diisobutyl naphthalene sulfonate and sodium disulfonate of dibutyl phenyl phenol; alkyl sulfates such as sodium lauryl sulfate; alkyl aryl polyether sulfonates; alkyl aryl polyether sulfates; and the sodium salt of dioctyl sulfo-succinate. Examples of nonionic surfactants which can be employed as emulsifying agents in the vinyl acetate emulsion polymerization recipe include alkyl aryl polyether alcohols such as nonyl phenoxy polyoxyethylene ethanol; Polyoxyethylene glycol esters of fatty acids; polyoxyethylated fatty alcohols; polyoxyethylated fatty amides and block copolymers of polyoxypropylene and polyoxyethylene wherein the polyoxypropylene portion of the molecule has a molecular weight of at least 900 and the polyoxyethylene portion of the molecule is about 10 to 90 percent, by weight. Although a wide variety of emulsifying agents can be employed, the exact emulsifying agent or combination of emulsifying agents to be used will depend upon the end properties desired and is readily apparent to those having ordinary skill in this art.

As previously indicated, the essence of the invention resides in the use of a particular protective colloid in the emulsion polymerization recipe whereby floc-free polyvinyl acetate emulsions can be prepared. The protective colloid which offers this surprising and unexpected property is a member selected from the group consisting of vinyl methyl ether/maleic anhydride copolymer, vinyl methyl ether/maleic anhydride-half amide copolymer and mixtures thereof. A comparative study was made between the protective colloids of the invention and the protective colloids of the prior art in order to demonstrate the significant reduction in floc and coagulum when PVM/MA and PVM/MA-half amide were employed in the emulsion polymerization recipe. The recipe and method of polymerization are set forth in Example IV and the results are graphically illustrated in the drawing.

Any of the polymerization catalysts which are suitable for use in polymerizing compounds containing an ethylenically unsaturated grouping, specifically a vinyl grouping, can be employed. Among such catalysts are the inorganic peroxides, e.g., hydrogen peroxide, barium peroxide, magnesium peroxide, etc., and the various organic peroxy catalysts, illustrative examples of which latter are: the dialkyl peroxides, e.g., diethyl peroxide, dipropyl peroxide, dilauryl peroxide, dioleyl peroxide, distearyl peroxide, di-(tert.-butyl) peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e.g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc.; unsymmetrical or mixed diacyl peroxides, e.g., acetyl benzoyl peroxide, propionyl benzoyl peroxide, etc.; terpene oxides, e.g., ascaridole, etc.; and salts of inorganic per-acids, e.g., ammonium persulfate, sodium persulfate, potassium persulfate, sodium percarbonate, potassium percarbonate, sodium perborate, potassium perborate, sodium perphosphate, potassium perphosphate, etc. Catalysts which accelerate polymerization as the result of the liberation of a free radical, e.g., sym.-dicyanotetramethylazomethane and similar known diazo polymerization catalysts, can be employed. Various reduction-oxidation ("redox") catalyst systems also can be used advantageously in many instances. Although a wide variety of catalysts can be used, it is preferred to employ a water soluble free radical producing catalyst. Examples of such water soluble catalysts include sodium, potassium and ammonium persulfates, hydrogen peroxide and $\alpha,\alpha$-azo-diisobutyronitrile.

Since it is desirable to maintain the pH of the emulsion between 3 and 7, an alkaline buffer, such as sodium bicarbonate, can be employed in order to control the pH.

According to one embodiment of the invention, vinyl acetate is polymerized in emulsion form in the presence of an emulsifying agent, a protective colloid, a catalyst and an alkaline buffer as illustrated by certain of the examples hereinafter set forth. Only a small amount of these latter materials is generally desirable in order not to deleteriously affect the properties of the product. On the other hand, a certain minimum is necessary for proper stability of the emulsion both during and after polymerization. The proportions set forth below are in parts by weight based upon 100 parts by weight of the monomer. Although about 2 to 7 parts by weight of an emulsifying agent can be used, it is preferred to employ about 2 to 5 parts of an emulsifying agent. The protective colloid of the invention can vary from 0.25 to 3 parts by weight; however, it is preferred to use about 0.25 to 1.5 parts by weight. Although the catalyst can vary from about 0.05 to 0.5 part by weight, it is preferred to employ about 0.05 to 0.2 part by weight of catalyst. The alkaline buffer can vary from 0.1 to 2.0 parts by weight and the preferred range is from about 0.1 to 1 part by weight.

In accordance with certain of its other aspects, this invention comprises a new process for preparing floc-free polyvinyl acetate emulsions. The process comprises heating and agitating a mixture of 100 parts of monomeric vinyl acetate wherein up to 30 parts of the monomer can be replaced with a comonomer, about 60 to 300 parts of water, about 2 to 7 parts of an emulsifying agent, about 0.25 to 3 parts of a protective colloid selected from the group consisting of PVM/MA, PVM/MA-half amide and mixtures thereof, about 0.05 to 0.5 part of a free radical initiating catalyst and about 0.1 to 2.0 parts of an alkaline buffer, in a reactor equipped with a reflux column until the monomer has substantially all polymerized. The heating step is carried out at a temperature in the range of about 60 to 82° C. However, by the addition of various promoters such as salts of transition elements and a number of reducing agents, it is possible to lower the temperature of polymerization to 20° C. or below. A preferred temperature range for preparing the emulsion polymer is from about 60 to 72° C.

Although all the ingredients of the emulsion recipe can be added to the reactor simultaneously, in a preferred method a stirred emulsion of 100 parts of monomeric vinyl acetate, about 2 to 6 parts of an emulsifying agent and about 60 to 250 parts of water is added to a heated and agitated solution of about 20 to 50 parts water, about 1 part of an emulsifying agent, about 0.25 to 3 parts of a member selected from the group consisting of PVM/MA, PVM/MA-half amide and mixtures thereof, about 0.05 to 0.5 part of a free radical producing catalyst and about 0.1 to 2.0 parts of an alkaline buffer and the reaction continued until the monomer has substantially polymerized.

The following examples further illustrate the invention. Where parts are given, they are parts by weight based upon 100 parts of the monomer.

In certain of the examples set forth below, the properties of the latex prepared in accordance with the examples are defined in terms of (1) coagulum content, (2) floc number, (3) mechanical stability and (4) viscosity.

Coagulum content is defined as the amount of large particles in the latex which can be separated therefrom by filtration. The proportion of coagulum formed during an emulsion polymerization reaction increases with increasing rate of reaction and increases with increasing conversion. The amount of coagulum formed is affected also by the composition of the reaction vessel as well as by the type of agitator employed and the rate of agitation. Formation of pools of monomer at the top of the mixture and evaporation of water from the surface increases coagulum. However, if the above factors are kept constant, the amount of coagulum formed will be dependent also upon the type of recipe used.

In order to determine the percent of coagulum, one hundred grams of latex are diluted with an equal weight of one percent $Na_3PO_4 \cdot 12H_2O$ solution and filtered through a weighed 80 mesh brass screen. The filtration vessel is a 1.5 inch diameter aluminum pipe union with a 5 inch long aluminum pipe in the top half. The brass screen is cut to fit the union. It is placed between the two halves and the union is threaded together. The coagulum deposited on the screen is washed with deionized water until the wash water comes through clear. The coagulum is then dried on the screen for at least six hours at 105° C. and weighed. Since 100 grams of latex are employed, the weight of the coagulum on the screen is the percent coagulum in the latex.

Floc number is a measure of the quantity of particles in a polymer latex intermediate in size between colloidally dispersed particles and coagulum. Floc is difficult to determine using the North fineness test and is not measured by settling tests. Thus, I have chosen an arbitrary scale of 1 to 10 to define the amount of floc in any polymer latex. Low numbers indicate a small floc content and high numbers, correspondingly, indicate a large floc content.

In order to determine the floc number, the latex is filtered through cheesecloth to remove coagulum or allowed to stand several days so that the coagulum settles to the bottom. A cylindrical glass rod 200 mm. long and 10 mm. in diameter is dipped into the latex and withdrawn. The rod is placed on a sheet of polyethylene on a support inclined 25° to the horizontal and allowed to remain three minutes. The quality of the latex is then evaluated from the number of spots, specks and rough places visible on the rod. A rating of 1, 2 or 3 would be good and a rating of 7, 8 or 9 would indicate a latex with a great deal of floc.

Mechanical stability is defined as the amount of time needed to coagulate a latex under rapid agitation. Mechanical stability tests are made using a Hamilton Beach Model 30 mixer at 15,000 r.p.m. The container is a 4 oz. wide-mouth round glass jar with a plastic cap which has a hole in it 34 mm. in diameter. Thirty-five mls. of latex are placed in a jar, the cap fastened on tightly, and the jar and contents placed in a 35° C. bath for ten minutes. The stirrer is introduced through the hole in the cap and turned on. Simultaneously, a stop watch is started. The time for coagulation of the latex is noted, but the test is run for no longer than 1200 seconds. A mechanical stability of about 600 seconds is, in general, considered a minimum value for commercial latices.

Viscosity is determined with a Brookfield rotating spindle viscometer. Viscosity measurements were made at 6, 12, 30 and 60 r.p.m. and comparisons were made at 30 r.p.m. Viscosities at 20 r.p.m. will usually differ very little from values obtained at 30 r.p.m. A commercial latex should have a value between about 200 and 2,000 cps. at 20 r.p.m.

EXAMPLE I

This example illustrates the large amount of floc and coagulum which is produced during the emulsion polymerization of vinyl acetate in the absence of a protective colloid. Three runs were carried out employing the recipes set forth in Table I below. The latices were prepared by the batch polymerization process.

In the batch process all the ingredients except the potassium persulfate are weighed into a three-neck flask equipped with a reflux condenser, thermometer and variable speed stirrer. The mix is brought to 65° C. in a constant temperature bath and the persulfate added. Oxygen-free nitrogen is then flushed through the mix for five minutes displacing oxygen from the system. After a short induction period the temperature rises and the polymerization reaction continues for about two hours, after which the temperature in the flask drops to that of the bath and the monomer has substantially all polymerized. If the flask temperature reaches 70° C. during the reaction, the mix is cooled. The mix must be stirred continuously. The rate of stirring is not important at the beginning of the reaction but must be closely controlled after 50 weight percent of the monomer has polymerized. The peripheral velocity of the tip of the propeller blade should preferably not go above 40 cm./sec. or too much coagulum will form.

Table I

|  | Parts by Weight | | |
|---|---|---|---|
|  | A | B | C |
| Vinyl acetate | 100.0 | 100.0 | 100.0 |
| Water | 82.0 | 82.0 | 82.0 |
| Pluronic [a] L61 Surfactant | | 3.2 | 3.2 |
| Pluronic [b] F68 Surfactant | 4.5 | 0.8 | 0.8 |
| Aerosol [c] 22 Surfactant | | 0.3 | |
| Triton [d] X-200 Surfactant | | | 0.5 |
| Sodium bicarbonate | | | 0.35 |
| Potassium persulfate | 0.075 | 0.075 | 0.075 |
| Floc number | 4 | 5 | 3 |
| Coagulum content, percent | 0.30 | 3.4 | 13.6 |
| Mechanical stability, sec. at 35° C. and 15,000 r.p.m. | 45 | 15 | 570 |
| Viscosity, cps., 20 r.p.m. | 215 | 15 | 23 |

[a] The registered trademark of a liquid nonionic surfactant marketed by Wyandotte Chemicals Corporation, Wyandotte, Michigan, consisting a a polyoxypropylene-polyoxyethylene block polymer wherein the polyoxypropylene hydrophobic base has a molecular weight of about 1600 to 1800 and the polyoxyethylene portion of the surfactant comprises about 10% of the molecule, by weight.

[b] The registered trademark of a solid nonionic surfactant marketed by Wyandotte Chemicals Corporation, consisting of a polyoxypropylene-polyoxyethylene block polymer wherein the polyoxypropylene hydrophobic base has a molecular weight of about 1600 to 1800 and about 80% of the molecule, by weight, consists of polyoxyethylene.

[c] The registered trademark of an anionic surfactant marketed by the American Cyanamid Company consisting of tetrasodium-N-(1,2-dicarboxy ethyl)-N-octadecyl sulfosuccinamate.

[d] The registered trademark of an anionic surfactant marketed by Rohm & Haas Company consisting of octyl phenoxy polyoxyethylene sodium sulfonate wherein the polyoxyethylene portion of the molecule contains about 10 to 12 oxyethylene units.

It will be noted from Table I that the latices prepared in the absence of a protective colloid have relatively poor properties. Thus, mechanical stability and viscosity are low whereas coagulum and floc are significantly high.

EXAMPLE II

This example illustrates the reduction in floc and coagulum when vinyl methyl ether-maleic anhydride copolymer is employed as a protective colloid in a vinyl acetate emulsion polymerization recipe. Two latices were prepared by batch process employing the procedure set forth in Example I. The recipes used are set forth in Table II below. The polymerization recipe described under heading A contained 1.0 part by weight of PVM/MA whereas the polymerization recipe described under heading B contained 0.5 part by weight of PVM/MA.

Table II

|  | Parts by Weight | |
|---|---|---|
|  | A | B |
| Vinyl acetate | 100.0 | 100.0 |
| Water | 82.0 | 82.0 |
| Pluronic [a] L61 Surfactant | 2.4 | 2.4 |
| Pluronic [b] F68 Surfactant | 0.6 | 0.6 |
| Aerosol [c] 22 Surfactant | 0.3 | 0.3 |
| PVM/MA | 1.0 | 0.5 |
| Sodium bicarbonate | 0.35 | 0.35 |
| Potassium persulfate | 0.10 | 0.10 |
| Floc number | 2 | 2 |
| Coagulum content, percent | 0.03 | 0.09 |
| Mechanical stability, sec. at 35° C. and 15,000 r.p.m. | 1,200 | 1,060 |
| Viscosity, cps. at 20 r.p.m. | 1,400 | 750 |

[a], [b] and [c] are the registered trademarks of synthetic surfactants which have been defined in Example I.

It will be noted from Table II that when PVM/MA is employed as the protective colloid in the vinyl acetate polymerization recipe, the amount of floc and coagulum found in the emulsion is significantly low. This result is in sharp contrast to results set forth in Example I where no protective colloid was employed.

EXAMPLE III

This example illustrates the delayed addition technique for preparing polyvinyl acetate emulsions of low floc and coagulum content. Water, emulsifying agent, PVM/MA, sodium bicarbonate and ammonium persulfate were admitted into a three-neck flask equipped with a reflux condenser, thermometer, and variable speed stirrer. The contents of the flask were heated to 65° C. by placing the flask into a constant temperature water bath. Oxygen-free nitrogen was then passed through the mixture in order to displace molecular oxygen from the system. A stirred emulsion of monomer, water, emulsifying agent, PVM/MA, sodium bicarbonate and ammonium persulfate was slowly added to the flask. After a short induction period, the temperature rose and the polymerization reaction continued for about 2 hours, after which the temperature in the reaction flask fell to that of the bath and the monomer had substantially all polymerized. Two polymerization reactions were carried out and the formulation and concentration of the ingredients of each are set forth in Table III below. It will be noted that the monomer employed in Formulation A was vinyl acetate and that a comonomer of vinyl acetate and ethyl acrylate was employed in Formulation B.

Table III

|  | Parts by Weight | |
|---|---|---|
|  | A | B |
| Storage Flask: | | |
| Vinyl acetate | 100.0 | 80.0 |
| Ethyl acrylate | | 20.0 |
| Water | 61.0 | 61.0 |
| Pluronic [a] L61 Surfactant | 2.4 | 2.4 |
| Pluronic [b] F68 Surfactant | 0.60 | 0.60 |
| Triton [c] X-200 Surfactant | 0.25 | 0.25 |
| PVM/MA | 0.25 | 0.25 |
| Sodium bicarbonate | 0.18 | 0.18 |
| Ammonium persulfate | 0.058 | 0.058 |
| Reaction Flask: | | |
| Water | 21.0 | 21.0 |
| Triton [c] X-200 Surfactant | 0.25 | 0.25 |
| PVM/MA | 0.25 | 0.25 |
| Sodium bicarbonate | 0.17 | 0.17 |
| Ammonium persulfate | 0.045 | 0.045 |
| Properties: | | |
| Floc number | 3 | 2 |
| Coagulum content, percent | 0.03 | 0.10 |
| Mechanical stability, sec. at 35° C. and 15,000 r.p.m. | >1,200 | >1,200 |
| Viscosity, cps. at 20 r.p.m. | 830 | 1,250 |

[a], [b] and [c] are the registered trademarks for synthetic surfactants which have been described in Example I.

It will be noted from Table III that the floc and coagulum content is significantly low when vinyl acetate and its comonomers are polymerized by the delayed addition technique in the presence of vinyl methyl ether-maleic anhydride copolymer as the protective colloid.

EXAMPLE IV

Several polyvinyl acetate emulsions were prepared employing different protective colloids in order to compare PVM/MA with the colloids of the prior art and, thus, demonstrate the significant reduction in floc and coagulum content when using the protective colloids of the invention. The polymerization recipe is set forth in Table IV. A batch polymerization process similar to the process set forth in Example I was used to prepare the emulsions. The protective colloids used in the polymerization recipe are set forth in Table V.

Table IV

| | Parts by weight |
|---|---|
| Vinyl acetate | 100.0 |
| Water | 82.0 |
| Pluronic [a] F68 surfactant | 0.6 |
| Pluronic [b] L61 surfactant | 2.4 |
| Aerosol [c] 22 surfactant | 0.3 |
| Protective colloid | 1.0 |
| Sodium bicarbonate | 0.35 |
| Potassium persulfate | 0.10 |

[a], [b] and [c] are the registered trademarks for synthetic surfactants which have been described in Example I.

Table V

| Protective Colloid | Floc Number | Coagulum Content, Percent | Mechanical Stability | Viscosity, cps., 30 r.p.m. |
|---|---|---|---|---|
| PVM/MA | 2 | 0.03 | >1,200 | 1,700 |
| PVM/MA-half amide | 2 | 0.05 | >1,200 | 2,075 |
| Polyacrylamide | 3 | 0.58 | 830 | 2,480 |
| Gum tragacanth | 3 | 0.49 | >1,200 | 1,675 |
| Propylene glycol alginate | 3 | 0.57 | 1,200 | 1,160 |
| Sodium carboxymethyl cellulose | 5 | 1.5 | 750 | 920 |
| Polyvinyl alcohol | 7 | 1.5 | 550 | 210 |
| Starch | 7 | 3.5 | >1,200 | 65 |
| Sulfonated-carboxylated starch | 7 | 3.7 | >1,200 | 580 |
| Polysaccharide (Citrus Pectin) | 8 | 0.93 | >1,200 | 235 |
| Protein (Gelatine) | 8 | 5.8 | 1,180 | 130 |
| Hydroxyethyl cellulose | 8 | 6.5 | 150 | 480 |
| Saccharide of arabinic acid (Gum Arabic) | 9 | 0.25 | 20 | 45 |
| Saccharide of polygalacturonic acid | 10 | | | 9,000 |
| Polyacrylic acid | 10 | | | 8,000 |

It will be noted from Table V that the floc and coagulum content of a polyvinyl acetate emulsion is significantly small when PVM/MA or PVM/MA-half amide is used as the protective colloid. This is in sharp contrast to the relatively large amount of floc and coagulum which are obtained when employing the protective colloids of the prior art such as polyvinyl alcohol, starch, sodium carboxymethyl cellulose and propylene glycol alginate.

From the foregoing description and examples, it will be evident that the objects of the invention have been accomplished, namely, a protective colloid has been found which, when added to a vinyl acetate emulsion polymerization recipe, will prevent or significantly minimize the formation of floc and coagulum in the emulsion polymer.

We claim:

1. A composition particularly adapted for forming a floc-free polyvinyl acetate emulsion comprising 100 parts by weight of monomeric vinyl acetate, about 60 to 300 parts by weight of water, about 2 to 7 parts by weight of an emulsifying agent selected from the group consisting of anionic emulsifying agents, nonionic emulsifying agents and mixtures thereof effective at a pH in the range of about 3-7, about 0.05 to 0.5 part by weight of a water soluble free radical polymerization catalyst and about 0.25 to 3 parts by weight of a protective colloid selected from the group consisting of vinyl methyl ether/maleic anhydride copolymer, the ammonia reaction product of vinyl methyl ether/maleic anhydride copolymer and mixtures thereof, said composition having a pH in the range of about 3 to 7.

2. A composition in accordance with claim 1 wherein up to about 30 parts by weight of said monomeric vinyl acetate are replaced with a copolymerizable monomer.

3. A composition in accordance with claim 1 wherein said water is in the range of about 75 to 125 parts by weight.

4. A composition in accordance with claim 1 wherein said emulsifying agent is a member selected from the group consisting of anionic surfactants, nonionic surfactants and mixtures thereof and is in the range of about 2 to 5 parts by weight.

5. A composition in accordance with claim 1 wherein said water soluble free radical polymerization catalyst is a member selected from the group consisting of alkali metal and ammonium persulfates, hydrogen peroxide and α,α azo-diisobutyronitrile and is in the range of about 0.05 to 0.25 part by weight.

6. A composition in accordance with claim 1 wherein said protective colloid is in the range of about 0.25 to 1.5 parts by weight.

7. A composition particularly adapted for forming a floc-free polyvinyl acetate emulsion comprising 100 parts by weight of monomeric vinyl acetate, about 80 to 90 parts by weight of water, about 2 to 4 parts by weight of an emulsifying agent selected from the group consisting of anionic emulsifying agents, nonionic emulsifying agents and mixtures thereof effective at a pH in the range of about 3-7, about 0.1 part by weight of ammonium persulfate, about 0.5 part by weight of vinyl methyl ether/maleic anhydride copolymer and up to about 0.35 part by weight of sodium bicarbonate said composition having a pH in the range of about 3 to 7.

8. A composition in accordance with claim 7 wherein up to 30 parts by weight of said monomeric vinyl acetate are replaced with a copolymerizable monomer.

9. A process for preparing floc-free polyvinyl acetate emulsions, which comprises heating and agitating a mixture of 100 parts by weight of monomeric vinyl acetate, about 60 to 300 parts by weight of water, about 2 to 7 parts by weight of an emulsifying agent selected from the group consisting of anionic emulsifying agents, nonionic emulsifying agents and mixtures thereof effective at a pH in the range of about 3 to 7, about 0.05 to 0.5 part by weight of a free radical polymerization catalyst, about 0.1 to 2.0 parts by weight of an alkaline buffer and about 0.25 to 3 parts by weight of a protective colloid selected from the group consisting of vinyl methyl ether/maleic anhydride copolymer, the ammonia reaction product of vinyl methyl ether/maleic anhydride copolymer and mixtures thereof, until the monomer has substantially polymerized, said mixture having an initial pH in the range of about 3 to 7, said heating step being carried out at a temperature in the range of about 60 to 82° C.

10. A process for preparing floc-free polyvinyl acetate emulsions, which comprises heating and agitating a mixture of 100 parts by weight of monomeric vinyl acetate wherein up to 30 parts by weight of said monomeric vinyl acetate are replaced with a copolymerizable monomer, about 75 to 125 parts by weight of water, about 2 to 5 parts by weight of an emulsifying agent selected from the group consisting of anionic emulsifying agents, nonionic emulsifying agents and mixtures thereof effective at a pH in the range of about 3 to 7, about 0.05 to 0.25 part by weight of a water soluble free radical polymerization catalyst, about 0.1 to 2.0 parts by weight of an alkaline buffer and about 0.25 to 1.5 parts by weight of a protective colloid selected from the group consisting of vinyl methyl ether/maleic anhydride copolymer, the ammonia reaction product of vinyl methyl ether/maleic anhydride copolymer and mixtures thereof, until the monomer has substantially polymerized, said mixture having an initial pH in the range of about 3 to 7, said heating step being carried out at a temperature in the range of about 60 to 82° C.

11. A process for preparing floc-free polyvinyl acetate emulsions, which comprises adding a stirred emulsion of 100 parts by weight of monomeric vinyl acetate, about 60 to 250 parts by weight of water and about 2 to 6 parts by weight of an emulsifying agent selected from the group consisting of anionic emulsifying agents, nonionic emulsifying agents and mixtures thereof effective at a pH in the range of about 3 to 7 to a heated and agitated solution of about 20 to 50 parts by weight of water, about 1 part by weight of an emulsifying agent selected from the group consisting of anionic emulsifying agents, nonionic emulsifying agents and mixtures thereof effective at a pH in the range of about 3 to 7, about 0.25 to 3 parts by weight of a protective colloid selected from the group consisting of vinyl methyl ether/maleic anhydride copolymer, the ammonia reaction product of vinyl methyl ether/maleic anhydride copolymer, and mixtures thereof, about 0.05 to 0.5 part by weight of a water soluble free radical polymerization catalyst and about 0.1 to 2.0 parts by weight of an alkaline buffer, and heating the mixture so formed until the monomer has substantially polymerized, said mixture having an initial pH in the range of about 3 to 7, said heating step being carried out at a temperature in the range of about 60 to 72° C.

12. A process for preparing floc-free polyvinyl acetate emulsions, which comprises adding a stirred emulsion of (I) 100 parts by weight of monomeric vinyl acetate wherein up to 30 parts of said vinyl acetate are replaced with a copolymerizable monomer, about 61 parts by weight of water, about 2.4 parts by weight of a nonionic block copolymer characterized by a polyoxypropylene hydrophobic portion having a molecular weight from about 1600 to 1800 and a polyoxyethylene hydrophilic portion making up about 10 weight percent of the nonionic copolymer, about 0.60 part by weight of nonionic block copolymer characterized by a polyoxypropylene hydrophobic portion having a molecular weight from about 1600 to 1800 and a polyoxyethylene hydrophilic portion making up about 80 weight percent of the nonionic copolymer, about 0.25 part by weight of octyl phenoxy polyoxyethylene sodium sulfonate wherein the polyoxyethylene portion of the molecule contains about 10 to 12 oxyethylene units, about 0.25 part by weight of vinyl methyl ether/maleic anhydride copolymer, about 0.18 part by weight of sodium bicarbonate and 0.058 part by weight of ammonium persulfate to a heated and agitated solution of (II) about 21.0 parts by weight of water, about 0.25 part by weight of octyl phenoxy polyoxyethylene sodium sulfonate wherein the polyoxyethylene portion of the molecule contains about 10 to 12 oxyethylene units, about 0.25 part by weight of vinyl methyl ether/maleic anhydride copolymer, about 0.17 part by weight of sodium bicarbonate and about 0.45 part by weight of ammonium persulfate and (III) continuing the reaction until the monomer has substantially polymerized, said mixture having an initial pH in the range of about 3 to 7, said heating step being carried out at a temperature in the range of about 60 to 72° C.

13. In a process for preparing a polyvinyl acetate emulsion wherein an aqueous mixture of monomeric vinyl acetate, an emulsifying agent selected from the group consisting of anionic emulsifying agents, nonionic emulsifying agents and mixtures thereof effective at a pH in the range of about 3 to 7, a protective colloid and a free radical polymerization catalyst is heated and agitated until the monomer has substantially polymerized, said aqueous mixture having a pH in the range of about 3 to 7, the improvement which comprises employing as the protective colloid a member selected from the group consisting of vinyl methyl ether/maleic anhydride copolymer, the ammonia reaction product of vinyl methyl ether/maleic anhydride copolymer and mixtures thereof whereby a polyvinyl acetate emulsion substantially free of floc and coagulum is obtained.

References Cited in the file of this patent

UNITED STATES PATENTS

| | | |
|---|---|---|
| 2,300,566 | Hahn et al. | Nov. 3, 1942 |
| 2,388,600 | Collins | Nov. 6, 1945 |
| 2,470,911 | Baer | May 24, 1949 |
| 2,545,702 | Norris | Mar. 20, 1951 |

OTHER REFERENCES

Schildknecht: "Polymer Processes," High Polymer Processes, volume X, page 75.

UNITED STATES PATENT OFFICE
CERTIFICATE OF CORRECTION

Patent No. 2,998,400                      August 29, 1961

David M. French

It is hereby certified that error appears in the above numbered patent requiring correction and that the said Letters Patent should read as corrected below.

Column 3, line 74, for "Polyoxyethylene" read -- polyoxyethylene --; column 5, lines 64 and 65, for "increases" read -- increase --; column 7, line 3 of footnote a of Table I, for "a", first occurrence, read -- of --; column 8, Table III, column 1, lines 7 and 13 thereof, for "Triton$^c$", each occurrence, read -- Triton$^d$ --; same Table III, line 1 of footnote thereof, for "($^c$)" read -- ($^d$) --; same column 8, line 68, for "Pluronic$^a$" read -- PLURONIC$^b$ --; line 69, for "Pluronic$^b$" read -- PLURONIC$^a$ --.

Signed and sealed this 23rd day of January 1962.

(SEAL)
Attest:
ERNEST W. SWIDER
Attesting Officer

DAVID L. LADD
Commissioner of Patents